US008011605B2

(12) United States Patent
Ward et al.

(10) Patent No.: US 8,011,605 B2
(45) Date of Patent: Sep. 6, 2011

(54) LIQUEFYING DE-WATERED SLUDGE PREPARATORY TO DRYING

(75) Inventors: Owen Patrick Ward, Waterloo (CA); Ajay Singh, Milton (CA)

(73) Assignee: Lystek International Inc., Waterloo, Ontario (CA)

( * ) Notice: Subject to any disclaimer, the term of this patent is extended or adjusted under 35 U.S.C. 154(b) by 355 days.

(21) Appl. No.: 12/041,005

(22) Filed: Mar. 3, 2008

(65) Prior Publication Data

US 2008/0302889 A1    Dec. 11, 2008

(30) Foreign Application Priority Data

Mar. 6, 2007  (GB) .................................. 0704310.2
Oct. 29, 2007  (CA) .................................... 2608506

(51) Int. Cl.
*B02C 19/00*    (2006.01)

(52) U.S. Cl. ............................................. 241/23; 241/65
(58) Field of Classification Search .................... 241/23, 241/65
See application file for complete search history.

(56) References Cited

U.S. PATENT DOCUMENTS 5,836,524 A * 11/1998 Wang ............................... 241/23
2004/0182953 A1 * 9/2004 Knoer ............................. 241/23
* cited by examiner

*Primary Examiner* — Mark Rosenbaum
(74) *Attorney, Agent, or Firm* — Anthony Asquith Corp

(57) ABSTRACT

Sewage sludge that has been de-watered to 25% solids is subjected to a combination of shearing and heating that liquefies the sludge, and drops its viscosity to below 12,000 cP. The fact of liquefaction prepares the sludge such that subsequent drying can be done more cost-effectively than hitherto. After drying, the dried sludge can be incinerated.

16 Claims, No Drawings

LIQUEFYING DE-WATERED SLUDGE PREPARATORY TO DRYING

The technology disclosed herein derives from that shown in patent publication U.S. Pat. No. 6,808,636 (Ward+Burd, October 2004).

In that patent, a range of conditions was described, under which a body of sludge with such a high solids-content that the body was unpumpable, was rendered pumpable. The range of conditions especially related to pH, temperature, and shearing of the sludge body.

It is now recognised that similar beneficial treatments can be effected over an extended range of conditions, especially in the area of preparing sludge for drying. Dried sludge sometimes is e.g formed into pellets, and is disposed of by being spread on agricultural fields, as fertiliser. Drying the sludge is also a necessary preliminary to disposing of the sludge by incineration. Some examples relating to drying batches of sludge are described below.

The solids content of sludge is determined by completely drying a sample of the sludge. The solids content is the mass remaining after all the water that can be driven off (by drying the sludge) has been driven off. To measure the solids content of the sludge, the technician places a sample of sludge, of known weight, in the drier. After a period of time, the mass of the remaining solids is determined. After more time, again the mass of remaining solids is determined. When there is no further reduction of the mass remaining, between successive measurements, that indicates that what remains is only the biosolids material, and all the water has been driven off.

When a de-watered sludge is described as comprising twenty percent solids, that means the sludge has been de-watered (e.g by mechanical squeezing or centrifuging), until the remaining sludge consists of twenty percent solids and eighty percent liquid (water) (by weight).

It is rarely economically practical, in the commercial operation of drying large quantities of sludge, in terms of the energy expended in the drying operation, to dry the sludge totally, so that no water at all remains. The expenditure of resources in a drying operation is always under tight scrutiny, and the fewer resources needed to dry the sludge to the desired target level, the better.

It is recognised that sludges differ as to how long it takes to drive off a given proportion of their water content. That is to say, when sludges have been prepared differently (as to the amount of shearing, levels of pH and temperature, etc), the sludges can differ as to the drying resources needed to reduce the water content by a given amount.

The prudent engineer therefore seeks a manner of preparing the sludge for drying that will enable the subsequent drying process to be as economical as possible. On the other hand, of course, there would be no benefit if the expenditure on preparation of the sludge for drying were to exceed the savings in drying resources—but it is recognised that the potential savings in expenditures on drying resources are quite large enough to justify considerable investment in liquefying the sludges prior to drying.

Some test results will now be presented, which show the effectiveness of reducing viscosity as a way of shortening drying time.

In Example I, the sludge was de-watered (in a press) to a solids-content of 22.1% solids (wt/wt). The pH of the sludge was adjusted to pH-10 by the addition of potassium hydroxide. (The addition had the effect of lowering the solids percentage to 21.0% solids.) For the tests, ten kg of the sludge was raised to the temperatures recited in Table-1 by heating the sludge in a reactor. The hot sludge was sheared in the reactor for the recited time periods at the recited temperatures, using a 1.5 kW shearing unit, having a 13-cm blade rotating at 4200 rpm.

Samples of the treated sludge were removed from the reactor after shearing for the time periods recited in Table. 1. Each removed sample was weighed and allowed to cool to ambient temperature, and its viscosity was measured.

It will be understood that sludge that has been de-watered to 21% solids is very stiff and almost cake-like, to the extent that a viscosity measurement is more or less meaningless. After shearing, however, the sludge is found to have been liquefied—that is to say, the same sludge is now readily characterisable as a liquid—and viscosity measurements become meaningful.

The removed sample was then (partially) dried in a hot air convection oven at 90° C. for twenty minutes. After drying, the sample was re-weighed, whereby the amount of water removed during drying was determined.

TABLE 1

| | De-watered to 21% solids, at pH = 10.0, | |
|---|---|---|
| Shearing Conditions: | Viscosity after shearing cPs | % of water content removed by 20 mins of drying |
| (not sheared) | — | 38% |
| shear at 70° C. for 20 min | 5130 | 53% |
| shear at 75° C. for 20 min | 5070 | 51% |
| shear at 80° C. for 20 min | 4860 | 53% |
| shear at 85° C. for 20 min | 4740 | 55% |
| shear at 70° C. for 60 min | 3620 | 59% |
| shear at 75° C. for 60 min | 3480 | 60% |
| shear at 80° C. for 60 min | 3500 | 65% |
| shear at 85° C. for 60 min | 3410 | 62% |

In Example. 2, the effect that shearing the de-watered sludge has on drying effectiveness now is evaluated in a system in which there was no pH adjustment. Apart from that, methods and equipment were the same as in Example. 1.

In Example. 2, the sludge samples were removed from the reactor after twenty, forty, sixty, minutes of shearing, and measurements were made as to viscosity. Then the samples were subjected to partial drying, again each sample being dried at 90° C. for twenty minutes. Measurements were made to determine the percentage of the water content of the sludge that was removed by the partial drying.

TABLE 2

| | De-watered to 21% solids, pH = 7.5 | |
|---|---|---|
| Shearing conditions: | Viscosity after shearing (cPs) | % of water content removed by 20 mins of drying |
| (not sheared) | — | 37 |
| Shear at 70° C. for 20 min | 6320 | 51 |
| Shear at 75° C. for 20 min | 6140 | 52 |
| Shear at 80° C. for 20 min | 5650 | 53 |
| Shear at 85° C. for 20 min | 5440 | 53 |
| Shear at 70° C. for 40 min | 4950 | 52 |
| Shear at 75° C. for 40 min | 4910 | 55 |
| Shear at 80° C. for 40 min | 4560 | 55 |
| Shear at 85° C. for 40 min | 4470 | 59 |
| Shear at 70° C. for 60 min | 4330 | 55 |
| Shear at 75° C. for 60 min | 4420 | 58 |
| Shear at 80° C. for 60 min | 4040 | 62 |
| Shear at 85° C. for 60 min | 3910 | 59 |

The Examples. 1, 2 results indicate that shearing at the indicated temperatures enhanced water removal or drying properties as compared to untreated dewatered biosolids, and indicate that increasing the duration of shearing enhanced drying properties. The results also indicate that increasing the processing temperature during shearing enhances drying properties. Generally a good correlation exists between drying properties and the viscosity of the liquefied sludge. The viscosity of the sheared sludge is a general indicator of the amount of resources that are put into the shearing, pH, and temperature—the lower the viscosity, the higher the resources. The shear-processed samples having the best drying properties exhibited the lowest viscosities.

In Example. 3, again the samples of the sludge are subjected to shearing, raised pH and raised temperatures, but now the drying time is varied. (Drying time was kept constant (at twenty minutes) in Examples. 1, 2.)

TABLE 3

| samples subjected to 60 minutes of shearing | Drying time at 90° C. | | | | |
|---|---|---|---|---|---|
| | 0 min | 15 min | 30 min | 60 min | 90 min |
| | percent solids content of sludge after drying (mass of water remaining in the sludge after drying, per unit mass of sludge solids) | | | | |
| (not sheared) | 22.3 | 26.5 | 34.8 | 43.7 | 53.1 |
| | (3.48) | (2.77) | (1.87) | (1.28) | (0.88) |
| Shear at 80° C., pH 10 | 21.8 | 28.7 | 43.6 | 64.1 | 80.7 |
| | (3.59) | (2.48) | (1.29) | (0.56) | (0.24) |
| Shear at 80° C., pH 11 | 21.6 | 27.3 | 45.0 | 67.5 | 80.0 |
| | (3.63) | (2.66) | (1.22) | (0.48) | (0.25) |
| Shear at 85° C., pH 10 | 21.8 | 29.1 | 45.4 | 70.3 | 83.8 |
| | (3.59) | (2.44) | (1.20) | (0.42) | (0.19) |
| Shear at 85° C., pH 11 | 21.6 | 29.2 | 44.1 | 67.7 | 83.0 |
| | (3.63) | (2.42) | (1.27) | (0.48) | (0.20) |

The impact of the improvements in drying can be understood from these figures. The effectiveness of the shearing treatment is barely apparent after only fifteen minutes of drying, in that the mass of water left in the sheared sludge is hardly different from the mass of water left in the un-sheared sludge. However, after ninety minutes of drying, the mass of water left in the sheared sludge is a great deal below—in fact, is barely a quarter of—the mass of water left in the un-sheared sludge.

It may be understood that the pH aspect is less important than the temperature and shearing aspects, when it comes to liquefaction. It may be suggested that the more cost-effective way to increase liquefactions rates would be by the combination of temperature and shearing, and that raising the pH would only be resorted to if the sludge is destined to be disposed of in some manner that requires a raised pH.

Thus the shearing operation, performed at the pH and temperature regimes as described, has resulted in the same drying operation (being the same as to temperature, duration, etc) being now very much more effective at taking water out of the sludge. Of course, shearing, raising the temperature, and raising the pH of a batch of sludge require an expenditure; it is recognised that the investment in those resources is much more than compensated for by the increased level of dryness of the final sludge product. Indeed, it is suggested that there is no other way in which that level of use of resources could produce an equivalent improvement in dryness.

The experiments show some of the benefits that arise from liquefying the sludge, and from reducing the viscosity of the liquid, prior to drying the sludge.

Reducing the viscosity of the sludge down below the base point of 12,000 cP is effective in enabling the drying process to be carried out more cost-effectively, as shown by the results recited in the tables. However, liquefying the sludge down below about 8,000 cP might be regarded as an extravagance, in that, below that level, the drying benefits attributable to a further reduction in viscosity start to become not worth the resources needed to produce that further reduction.

The said U.S. Pat. No. 6,808,636 showed that it is possible to liquefy sewage sludge that has been so thoroughly de-watered that such sludge would traditionally be regarded as intractably solid. It is recognised that even sludge with a solids content as high as e.g thirty percent can, in fact, be economically liquefied.

Sludge that is destined to be disposed of in such manner that the sludge needs to be dried should be de-watered as much as possible, by squeezing or centrifuging the sludge. A simple screw-press can squeeze water out of sludge to the extent that the sludge is left with e.g fifteen percent solids. A (more costly) belt-press can squeeze enough water out of the sludge that the sludge is left at e.g between seventeen to twenty-two percent solids. Centrifuging can squeeze more water out still, but starts to be impractical or uneconomical above about thirty percent solids.

It is suggested that, in a technology involving steps being taken to improve drying performance, the sludge should start off by being de-watered to at least the twenty-five percent solids level. Below that, it is hardly worthwhile spending money on improving drying performance, when more water can simply and cheaply be squeezed out.

One aspect of commercially-economical liquefaction of such solid sludge lies in high-violence shearing, coupled with heating the sludge to at least sixty deg C. It is recognised that, at this temperature, it is indeed possible to shear the de-watered sludge so violently that the apparently-solid sludge will become liquefied, to the extent that its viscosity becomes measurable, and indeed its viscosity can be reduced to below 12,000 centipoise.

Liquefying highly de-watered sludge is advantageous for a number of reasons, as described herein. The liquefaction process is described as it relates mainly to preparing the sludge for subsequent drying—and also for incineration, which also requires the sludge to be thoroughly de-watered and dried—but the technology required to liquefy the high-solids sludge, as described herein, can be applied to sludge generally, whatever the reason for desiring such liquefaction.

The high-solids sludge can be liquefied by shearing the sludge while the sludge is hot, i.e above about sixty deg C. Of course, it is up to the designer to provide enough shearing violence, and to the engineer to continue shearing for a long enough time, as to drive the viscosity of the high-solids sludge down to at least the 12,000 cP level, and below that in many cases. But it is recognised, as a factor in the present technology, that reasonably economical shearing (at sixty deg C.) can indeed achieve that degree of liquefaction in high-solids sludge. Higher temperatures, more violent or more prolonged shearing, and raising the pH of the sludge, can all be expected to permit or enable even lower viscosities to be achieved, should that be a desideratum. The technology enables a better compromise to be reached, between expenditure on resources for liquefying the sludge and expenditure on resources for drying the sludge. Thus, if a very powerful centrifuge happens to be available at the station, such that the sludge can be de-watered to e.g thirty percent solids or more, it might pay the designer to provide for heating the sludge to a higher temperature than sixty deg C., say to eighty deg C., and to prolong the shearing operation.

The sludge as received at the sewage treatment station might be raw sewage sludge. However, preferably the received sludge has undergone at least a preliminary digestion reaction. If the incoming sludge has not been de-watered at all, the sludge will have a solids content of under five percent (the rest being liquid, mainly water).

In preparation for drying, the received liquid (watery) sewage should, as mentioned, be de-watered as thoroughly as possible. Sludge can be de-watered up to about fifteen percent solids by the use of a simple screw-press. When preparing sludge for drying, it will usually be found to be economical to physically de-water the sludge as much as possible, whereby the designer will usually prefer to call for the use of a centrifuge apparatus.

When de-watered sludge is to be transported, or is to be processed through a drying apparatus, or is to be processed in more or less any manner that involves physical movement of the sludge, it is more economical if the sludge is in liquefied form.

As mentioned, it has been found to be economically possible, in order to liquefy the sludge, to subject the sludge to violent shearing, and while doing so to subject the sludge to a high temperature—e.g sixty deg C.—or, better still, seventy or eighty deg C., or even more.

In some cases, the designer might provide for the pH level of the sludge to be raised, during shearing of the sludge,—for example as high as pH nine. However, it has been found that, in terms of cost-effectiveness in preparing sludge for drying, raising the pH may be regarded as less cost-effective than raising the temperature.

Raising the pH can be cost-effective in reducing the pathogens that would otherwise be present in the sludge—but this is of little importance if the sludge is destined e.g to be incinerated, after being dried. But, if the sludge, after being dried, is destined instead to be e.g formed into grains or pellets and used as fertiliser, then the absence of pathogens is now important. Also, a high pH can be a useful factor, per se, in a fertiliser, and in that case, the designer might prefer to specify raising the pH of the sludge during shearing. But again, the important factor, when preparing sludge for drying, is to thoroughly de-water the sludge, and then to liquefy the de-watered sludge by subjecting the sludge to a combination of violent shearing action and raised temperature.

The degree of violence can be equated to the amount of power drawn by the motor in the shearing apparatus. The required amount of power will now be considered.

The shearing apparatus is associated with a liquefaction reactor vessel on a one-to-one basis—that is to say, all the sludge in a particular reactor vessel is sheared by the shearing apparatus associated with that reactor, and all the sludge that can be sheared by a particular shearing apparatus is contained within a single respective reactor.

The violence-to-power equivalence, when liquefying sludge that has been de-watered to more than about twenty-five percent solids may be stated as: for every one tonne of solids content of the sludge contained in the reactor, the motor driving the shearing blades should be capable of operating at twenty kilowatts, or more. Thus, if the reactor contains, say, two tonnes of solids (which, at thirty-percent-solids sludge, totals around seven tonnes of sludge in the reactor), the motor driving the shearing blades should be capable of supplying at least forty kilowatts of mechanical power to the blades.

Typically, the volumetric capacity of a liquefaction reactor at a sludge treatment facility would be e.g ten cubic metres of sludge. That amount of sludge (in the highly de-watered condition) might contain around three tonnes of solids. The shearing apparatus associated with such a reactor should have a power capacity of sixty kilowatts.

It is recognised that the time taken for the shearing phase is also important. Of course, shearing the sludge in the reactor, even at a high power, for just a few seconds would have little significant effect. The longer the shearing continues, the more effectively the sludge is liquefied and homogenised (although there is a diminishing-returns effect after a time). Thus, the designer should consider the duration of time over which the shearing continues. In the context of liquefying sludge that contains thirty percent solids, it may be regarded that the twenty kilowatts per tonne of solids content, mentioned above, should be continued for at least thirty minutes. The upper and lower limits may be set at ten and forty kilowatts per tone of solids content.

In fact, the trade-off between power of shearing and length of time of shearing may be taken into account, by stipulating that a batch of sludge should be exposed to at least ten kilowatt-hours of mechanical shearing power, per tonne of solids. Similarly, if the sludge is being fed through the reactor at a continuous throughput rate of sludge (measured in tonnes per hour), the sludge should be subjected to ten kilowatts of shearing per tonne/hour of throughput.

The forces acting on the shearing blades depend upon the viscosity of the sludge. Thus, when the sludge is solid, or almost solid, as at the start of a shearing episode on that sludge, the forces on the blades will be significantly higher than when the liquefaction process is nearing completion. From this standpoint, it is preferred to carry out the liquefaction continuously, rather than on a batch basis.

In continuous liquefaction, the liquefied sludge is discharged from the reactor in a more or less steady flowrate, and the sludge awaiting treatment is fed into the reactor continuously at the same steady rate. In continuous shearing, to ensure proper liquefaction, the flowrate should not be more than half the turnover, per hour, of the quantity contained in the reactor.

In continuous liquefaction, where the throughput flowrate of sludge is measured at TP tonnes of the solids-content of the sludge, per hour, that throughput preferably should be subjected to shearing at a power level, in kilowatts, of ten times TP kilowatts. The lower limit of shearing power would be about five times TP kilowatts; below that, the ability to liquefy the sludge at all might be compromised. The higher limit would be about twenty times TP kilowatts; above that, if the sludge has not been liquefied by that much shearing power, the application of more shearing power probably is not going to liquefy it.

In batch liquefaction, basically all the liquefied sludge is emptied out of the reactor at the end of the liquefaction phase, and a new batch of solid sludge is then added into the reactor. Now, the duration of shearing is more meaningfully relevant than the sludge turnover rate, whereby the designer may now prefer to design the liquefaction system according to the need, as mentioned above, to subject the sludge to at least ten kilowatt-hours of mechanical shearing power, per tonne of solids, for at least thirty minutes. In batch processing, the shearing blades might not be able to cope with the initial heavy forces caused by the fact that the de-watered sludge is initially solid, and in that case the initial shearing might have to be done with the blades being driven at e.g half power.

In batch-liquefaction, where the solids-content of the sludge in the batch is measured at SC tonnes, the batch preferably should be subjected to shearing at such power level, and for such duration, that the shearing work done on the batch is ten times SC kilowatt-hours. The lower limit of shearing work done would be about five times SC kilowatt-hours; below that, the ability to liquefy the sludge at all might be compromised. The higher limit would be about twenty times SC kilowatt-hours; above that, if the sludge has not been liquefied by that much shearing energy, the addition of more shearing energy probably is not going to liquefy it.

In partial-batch-continuous liquefaction, batches of incoming solid sludge, each batch having a volume that is a significant proportion of the volume of the sludge in the reactor, are admitted from time to time into the reactor. The proportion is significant in that, just after admitting the incoming batch, the average viscosity of the sludge increases enough that the blades have to be protected (by being operated at lower power for a time) from the increased blade forces, until liquefaction has become established—but not to the same extent as with full batch liquefaction. (If the blades do not have to be protected because of the incoming sludge, it may be regarded that the sludge is being liquefied on a continuous or quasi-continuous basis.) Continuous liquefaction of the sludge is more efficient, and is preferred for that reason—in batch-treatment, allowances have to be made for the fact that conditions change during the course of treatment. However, the manner of treatment is often dictated by other economic considerations.

It is emphasised that this liquefied sludge, despite being liquid, and hence pumpable, has been so de-watered as to contain a very high proportion of solids—as much as twenty-five or even thirty percent. (Above about thirty percent solids, the sludge might not be liquefiable by the technology described herein.) It is recognised that the liquefaction of such apparently intractably-solid sludge has been achieved, typically, by a combination of violent shearing and high temperature.

Liquefied de-watered sludge (unlike stiff cake-like de-watered sludge) can be physically moved about and stored by being pumped into tanks—including stationary tanks or tanks mounted on a vehicle, for example. Liquefied sludge also can be sprayed, still as a liquid, onto an agricultural field, for example. If sprayed from a stationary tank, through a hose, the viscosity of the sludge preferably should be no more than about 2000 cp; if from a tank mounted on the spray vehicle, no more than about 5000 cp. Higher viscosities can be accommodated sometimes, e.g if a higher-than-normal spray pressure can be provided. (However, it is in many cases not economically practical to liquefy high-solids sludge to a low enough viscosity as to enable the sludge to be sprayed or injected.) However, viscosities as low as 2000 cP will probably not be achievable, using the technology described herein.

It is recognised that it is beneficial for the sludge to be in liquid form, in preparation for being dried. Traditionally, sludge destined to be dried, having been de-watered enough for the sludge to be cake-like, is solid to the extent that the sludge has to be conveyed into the dryer by solids-handling screw conveyors and the like. One reason for liquefying the sludge, prior to drying, lies in the comparative ease of handling the liquid material. It may be noted that, traditionally, sometimes, dried sludge has had to be mixed with oil, in order to improve its conveyability.

Another reason for liquefying sludge that is destined to be dried is that the liquefied sludge dries significantly faster than the same sludge that has not been liquefied. (In this context, drying the sludge means driving off (some of) the sludge's water-content by promoting evaporation, for example by heating.)

Also, of course, as outlined in detail above, a major reason for liquefying the sludge, prior to drying, is that liquefied sludge can be dried using significantly fewer resources than the same sludge unliquefied.

Some sludge-drying systems, which are especially suitable for drying liquefied sludge, will now be described. A liquid sludge can be dried using a drum-dryer. In one example of such a system, a rotating drum is arranged to be immersed, as to a bottom portion of the drum, in the liquid sludge. As the drum rotates, liquid sludge adheres to the drum surface. The drum surface is heated, and the sludge dries by direct contact with the heated drum. As it dries, the sludge becomes solid enough that it can be scraped off the drum surface. A scraper is located in position to scrape the dried sludge off the drum before it once again enters the liquid. The scraped-off dried sludge is collected, ready to be conveyed for whatever further processing is required. (Of course, the dried sludge is no longer liquid, and has to be conveyed using equipment for handling solid material.)

An alternative is to dry the sludge in a hot-air dryer. This kind of dryer includes a hot-air-chamber, and an air-heater for heating the air in the chamber. The liquefied sludge is sprayed (or dripped) into the hot air in the chamber, where the air is hot enough that the sludge dries enough to become solid—or at any rate, to become non-liquid. Again, the dried sludge is collected, and conveyed for further processing. As mentioned, the dried sludge may be formed into pellets, and then used as a granular fertiliser, or may be incinerated.

In a de-humidification drying system, low-humidity air is passed over the material to be dried. One of the benefits of this system is that reduced (or even no) heat energy is required.

Sludge that is destined to be incinerated has to be dried first. The dried sludge prepared as described above is suitable for incineration. It is advantageous if the already-hot dried sludge can be incinerated while it is still hot. Hot liquefied sludge at thirty percent solids can burn with sufficient energy to sustain its own burning process, without the addition of extra fuel, such as oil. In fact, the burning sludge can release enough energy to produce useful heat, or to consume other organic materials, in a co-incineration process.

Generally, it is not worthwhile drying sludge, at all, unless the sludge is going to be dried to a solids content of fifty percent or more. If the sludge is destined to be incinerated, the sludge should be dried to a minimum of sixty percent solids.

The "solids-content" of the sludge, as that expression is used herein, should be taken to be all the solid organic materials suspended in the incoming sludge, and all organic materials that come out of solution during treatment—and also all (living and dead) microbes or bacteria that are present in the sludge, having consumed (some of) the substances contained in the sludge. Sometimes, sewage sludge contains significant quantities of inorganic solid materials; in that case, the inorganic material is also included in the "solids-content" numbers that are specified herein.

The invention claimed is:

1. Procedure for liquefying solid sewage sludge, being sludge that has a solids content of twenty-five percent or more, including:
   raising the temperature of the sludge to at least sixty degC;
   at that temperature, shearing the sludge violently enough, and for long enough, to liquefy the sludge, whereby the sludge then has a viscosity of 12,000 centipoise or less.

2. Procedure for liquefying solid sewage sludge, being sludge that has a solids content of twenty-five percent or more, including:
   raising the temperature of the sludge to at least sixty degC;
   at that temperature, shearing the sludge violently enough, and for long enough, to liquefy the sludge, whereby the sludge then has a viscosity of 12,000 centipoise or less;
   providing a liquefaction reactor, which is structurally suitable for containing the de-watered sludge;
   providing a shearing apparatus, having shearing blades and a motor;
   where the shearing apparatus is physically capable of, and suitable for, moving the shearing blades violently enough to tear open biological cells in the batch of de-watered sludge in the liquefaction reactor; and operating the motor to shear the sludge in the reactor.

3. Procedure as in claim 2, including:

either:

feeding the sludge through the liquefaction reactor in batches, the mass of the solids content of one batch of sludge being SC tonnes;

operating the motor to shear the sludge in the batch in the reactor, at such power and for such duration that the batch of sludge experiences at least Mmin kilowatt-hours of shearing;

where Mmin equals SC multiplied by five;

or:

feeding the sludge through the liquefaction reactor continuously, at an averaged throughput rate of TP tonnes of the solids content of the de-watered sludge, per hour;

operating the motor to shear the sludge passing through the reactor at a power of MPmin kilowatts;

where MPmin equals TP multiplied by five.

4. Procedure as in claim 3, including:

either:

operating the motor to shear the sludge in the batch in the reactor, at such power and for such duration that the batch of sludge experiences no more than Mmax kilowatt-hours of shearing;

where Mmax equals SC multiplied by twenty;

or:

operating the motor to shear the sludge passing through the reactor at a power of no more than MPmax kilowatts;

where MPmax equals TP multiplied by twenty.

5. Procedure as in claim 4, wherein the motor has a power rating, per tonne of solids content in the sludge in the liquefaction reactor, of PR kilowatts, where PR lies between SC multiplied by ten and SC multiplied by forty.

6. Procedure as in claim 2, including, while shearing and heating the sludge in the reactor, also raising the pH of the sludge in the reactor to no more than pH-9.

7. Procedure as in claim 2, including, while shearing the sludge in the reactor, raising the temperature of the sludge in the reactor to seventy degC or more.

8. Procedure as in claim 2, including shearing the sludge violently enough, and for long enough, to drive the viscosity of the liquefied sludge down below 8,000 centipoise.

9. Procedure as in claim 2, including providing a drying apparatus, and so drying the liquefied sludge therein that the dried sludge has a solids content of fifty percent, or more.

10. Procedure as in claim 9, including:

providing the drying apparatus in the form of a drum-dryer, having a rotary heated drum, and having a scraper;

so arranging the drying apparatus that:

a lower portion of the drum lies in contact with the liquid sludge, whereby sludge is picked up on the surface of the rotating drum; and the sludge is dried by direct contact with the heated drum, and becomes substantially non-liquid;

so arranging the scraper as to scrape the dried sludge off the drum, thereby preventing the dried sludge from re-entering the liquid sludge; and collecting the scraped-off dried sludge, and conveying the same away from the drying apparatus.

11. Procedure as in claim 9, including:

providing the drying apparatus in the form of a hot-air dryer, having an air-heater, and having a hot-air-chamber for containing heated air;

spraying or dripping the liquefied sludge into and through the hot-air-chamber, whereby the sludge dries and becomes substantially non-liquid; and collecting the dried sludge, and conveying the same away from the drying apparatus.

12. Procedure as in claim 9, including:

so drying the sludge the liquefied sludge that the dried sludge has a solids content of sixty percent, or more; and conveying the dried sludge from the drying apparatus into an incinerator apparatus, which is effective to ignite and incinerate the dried sludge.

13. Procedure as in claim 12, including conveying the dried sludge from the drying apparatus into the incinerator apparatus while the dried sludge is still in a hot condition.

14. A sewage sludge treatment station, wherein:

the station is suitable for preparing sewage sludge for drying;

the station includes a de-watering apparatus, which is effective to remove enough water from incoming sludge that the solids content level of resulting de-watered sludge is twenty-five percent or more;

the station includes a liquefaction reactor, which is physically suitable for receiving de-watered sludge from the de-watering apparatus;

the station includes an operable shearing apparatus, having shearing blades, which is effective, when operated, to shear sludge in the reactor;

the shearing apparatus is physically capable of, and suitable for, moving the shearing blades violently enough to tear open biological cells in the batch of de-watered sludge in the liquefaction reactor;

the shearing apparatus includes a motor, which is physically suitable for moving the shearing blades violently enough to tear open biological cells in the sludge in the reactor;

the station includes a heating apparatus, which is effective to heat the de-watered sludge in the reactor to a temperature of sixty degC or hotter; and the shearing apparatus and the heating apparatus are of such structure as to be physically capable of liquefying the de-watered sludge in the reactor to a viscosity of 12,000 centipoise or less.

15. Station as in claim 14, wherein the station also includes a drying apparatus, for drying the liquefied sludge from the reactor.

16. Station as in claim 15, wherein the station also includes an incinerator, for incinerating the dried sludge from the drying apparatus.

\* \* \* \* \*